(12) United States Patent
Karipides et al.

(10) Patent No.: US 8,050,069 B2
(45) Date of Patent: Nov. 1, 2011

(54) METHOD AND APPARATUS FOR ELECTRICAL BUS CENTERING

(75) Inventors: David Dimitri Karipides, Casstown, OH (US); Rui Zhou, Mason, OH (US); Arthur Vorwerk Radum, Mason, OH (US); Hao Huang, Troy, OH (US)

(73) Assignee: General Electric Company, Schenectady, NY (US)

( * ) Notice: Subject to any disclaimer, the term of this patent is extended or adjusted under 35 U.S.C. 154(b) by 285 days.

(21) Appl. No.: 12/475,164

(22) Filed: May 29, 2009

(65) Prior Publication Data
US 2010/0302823 A1 Dec. 2, 2010

(51) Int. Cl.
*H02M 7/02* (2006.01)
(52) U.S. Cl. .......................................... 363/125; 363/64
(58) Field of Classification Search ................ 363/44, 363/52, 81, 84, 89, 125, 127, 5, 64, 153, 363/171
See application file for complete search history.

(56) References Cited

U.S. PATENT DOCUMENTS

| | | | |
|---|---|---|---|
| 4,162,525 A * | 7/1979 | Epp ................................. | 363/71 |
| 4,587,436 A | 5/1986 | Cronin | |
| 5,412,557 A | 5/1995 | Lauw | |
| 5,508,594 A | 4/1996 | Underwood et al. | |
| 5,644,485 A * | 7/1997 | Asplund ....................... | 363/129 |
| 5,831,409 A | 11/1998 | Lindberg et al. | |
| 6,295,215 B1 | 9/2001 | Faria et al. | |
| 6,577,106 B2 | 6/2003 | Lazarovich | |
| 6,995,658 B2 | 2/2006 | Tustison et al. | |
| 7,468,561 B2 | 12/2008 | Kern et al. | |
| 2006/0152085 A1 | 7/2006 | Flett et al. | |
| 2008/0100136 A1 | 5/2008 | Langlois et al. | |
| 2008/0103632 A1 | 5/2008 | Saban et al. | |

FOREIGN PATENT DOCUMENTS
EP 1995860 A2 11/2008

OTHER PUBLICATIONS

Ainsworth N. et al. "Paralleling of 3-phase 4-wire DC-AC Inverters Using Repetitive Control", APEC 2009. Feb. 15, 2009. Piscataway, NJ USA. pp. 116-120, XP031442663.
Carocci F. et al. "Transformerless 4-leg current conditioner with voltage restoring capability", APEC 2000. Feb. 6, 2000. vol. 2, pp. 880-886, XP010371686.
Search Report and Written Opinion issued in connection with PCT/US2010/028473, Aug. 5, 2010.

* cited by examiner

*Primary Examiner* — Gary L Laxton
(74) *Attorney, Agent, or Firm* — David J. Clement, Esq.; Armstrong Teasdale LLP

(57) ABSTRACT

A bus centering device for use in an aircraft electrical power distribution system that includes a positive bus rail, a negative bus rail, and a ground is described. The device includes a central node, a first and second switching component configured to couple the central node to the positive rail and the negative rail for a first and second predetermined duty cycle, respectively. The device includes an inductive component coupled between the central node and ground, and is configured to maintain a voltage at the central node substantially equal to ground, wherein a voltage between the positive rail and the central node is maintained substantially equal to a voltage between the negative rail and the central node. The device includes a first and second current limiting device configured to maintain a continuity of current from the inductive component when the first and second switching components are turned off.

17 Claims, 3 Drawing Sheets

METHOD AND APPARATUS FOR ELECTRICAL BUS CENTERING

BACKGROUND OF THE INVENTION

The present application relates generally to aircraft power systems, and, more particularly, to a method and apparatus for electrical bus centering.

Aircraft power systems provide electrical power to numerous components. A current trend is to include more electrical components in aircraft. This trend results in an increased power demand from the aircraft electrical power distribution system. At least some known aircraft power distribution systems minimize electrical feeder weight by increasing the electrical distribution, or bus, voltage level. In some known aircraft, the aircraft bus voltage exceeds 270 volts direct current (VDC).

As the aircraft bus voltages increase, a concomitant increase in risk to maintenance personnel and other aircraft components is created due to an increased risk of accidental electrical discharge. Moreover, a risk of undesirable corona discharge is increased at high aircraft bus voltages. Accordingly, in some known aircraft systems, aircraft bus voltages exceeding 270 VDC are provided using a bipolar bus that is centered about aircraft chassis ground, rather than a unipolar bus. However, at least some known bipolar bus implementations are less efficient than unipolar bus implementations. Additionally, at least some known bipolar bus implementations increase the weight of the aircraft over unipolar bus implementations.

BRIEF DESCRIPTION OF THE INVENTION

In one embodiment, a bus centering device for use in an aircraft electrical power distribution system that includes a positive bus rail, a negative bus rail, and a ground is provided. The bus centering device includes a central node, a first switching component that is configured to couple the central node to the positive bus rail for a first predetermined duty cycle, and a second switching component that is configured to couple the central node to the negative bus rail for a second predetermined duty cycle. The device also includes an inductive component that is coupled between the central node and the ground. The inductive component is configured to maintain a voltage at the central node substantially equal to ground potential, wherein a voltage between the positive bus rail and the central node is maintained substantially equal to a voltage between the negative bus rail and the central node. The device also includes a first current limiting device that is coupled to the first switching component and the inductive component. The first current limiting device is configured to maintain a continuity of current from the inductive component when the first switching component is turned off. The device includes a second current limiting device that is coupled to the second switching component and the inductive component. The second current limiting device is configured to maintain a continuity of current from the inductive component when the second switching component is turned off.

In another embodiment, an aircraft electrical bus system that includes a positive bus rail, a negative bus rail, and a ground is provided. The system includes a power source, a load, and a bus centering device. The bus centering device includes a central node, a first switching component that is configured to couple the central node to the positive bus rail for a first predetermined duty cycle, and a second switching component that is configured to couple the central node to the negative bus rail for a second predetermined duty cycle. The device also includes an inductive component that is coupled between the central node and the ground. The inductive component is configured to maintain a voltage at the central node substantially equal to ground potential, wherein a voltage between the positive bus rail and the central node is maintained substantially equal to a voltage between the negative bus rail and the central node. The device also includes a first current limiting device that is coupled to the first switching component and the inductive component. The first current limiting device is configured to maintain a continuity of current from the inductive component when the first switching component is turned off. The device includes a second current limiting device that is coupled to the second switching component and the inductive component. The second current limiting device is configured to maintain a continuity of current from the inductive component when the second switching component is turned off.

In another embodiment, a method for centering an aircraft electrical power distribution system that includes a positive bus rail, a negative bus rail, and a ground is provided. The method includes providing a power source and a load that is coupled to the power source, and coupling a bus centering device to the positive bus rail, the negative bus rail, and the ground. The bus centering device includes a central node, a first switching component, a second switching component, and an inductive component. The inductive component is coupled between the central node and the ground. The method also includes coupling the central node to the positive bus rail for a first predetermined duty cycle, coupling the central node to the negative bus rail for a second predetermined duty cycle, and maintaining a voltage at the central node substantially equal to ground potential, wherein a voltage between the positive bus rail and the central node is maintained substantially equal to a voltage between the negative bus rail and the central node.

DETAILED DESCRIPTION OF THE INVENTION

Figure 1:
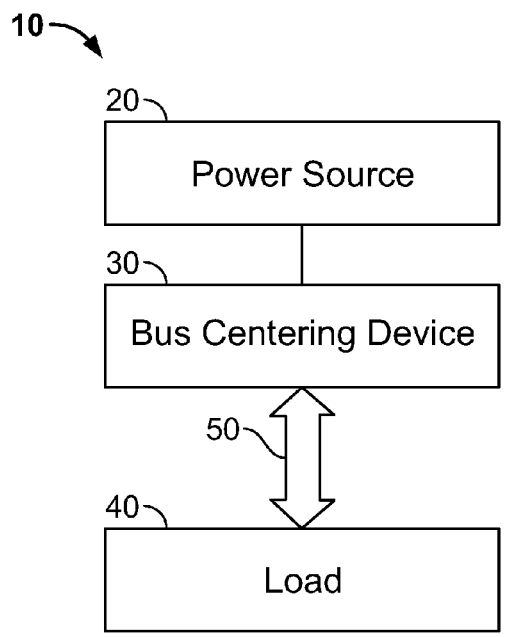
FIG. 1 is a block diagram of an exemplary aircraft power distribution system.

FIG. 1 is a block diagram of an exemplary aircraft power distribution system 10. System 10 includes at least one power source 20 that is coupled to at least one load 40 via an aircraft electrical distribution line, or bus, 50. In the exemplary embodiment, power source 20 is a synchronous, three phase alternating current generator that includes a rotor and a stator (not shown). In the exemplary embodiment, power source 20 includes a rectifier circuit (not shown) to convert the three phase alternating current to direct current (DC), which is used to energize bus 50, and ultimately load 40. Power source 20 may generate DC power that is floating with respect to an aircraft chassis ground (not shown). As such, a bus centering device 30 may be coupled to bus 50 to substantially center bus 50 about ground. As used herein, the term "centering" refers to adjusting a first voltage rail and a second voltage rail such that the first voltage rail has a voltage level that is a positive level above a reference point, and the second voltage rail has a voltage level that is substantially equal to the first voltage level, but negative with respect to a reference point. For example, a bus may have a first voltage rail of 300 VDC, and a second voltage rail of 100 VDC. Centering this bus about a ground level of 0 VDC would result in the first voltage rail being +100 VDC and the second rail being −100 VDC.

Figure 2:
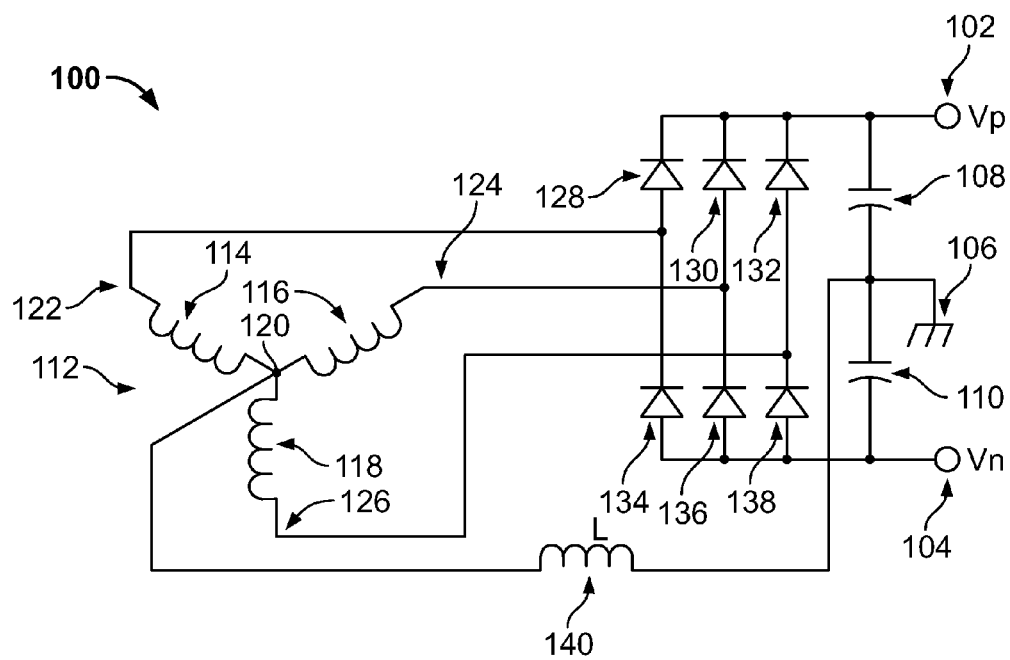
FIG. 2 is a schematic diagram of a portion of a prior art power distribution system that may be used with the aircraft power distribution system shown in FIG. 1.

FIG. 2 is a schematic illustration of a portion of a prior art power distribution system 100. Prior art system 100 includes a positive terminal 102 and a negative terminal 104. Terminals 102 and 104 are configured to be connected to an aircraft electrical bus such as bus 50 (shown in FIG. 1). Positive and negative terminals 102 and 104 are coupled to aircraft chassis ground 106 via capacitors 108 and 110, respectively. Prior art system 100 also includes a generator 112 such as a three phase wye-connected stator or transformer for use in generating power. Generator 112 includes a first, second, and third winding 114, 116, and 118 that are coupled together at a common center point 120. Center point 120 is coupled to chassis ground 106, which facilitates centering prior art system 100 about ground 106. An inductor 140 may be coupled between center point 120 and chassis ground 106, as described below. A terminal 122 of first winding 114 is coupled to positive terminal 102 via diode 128 and to negative terminal 104 via diode 134. A terminal 124 of second winding 116 is coupled to positive terminal 102 via diode 130 and to negative terminal 104 via diode 136. A terminal 126 of third winding 118 is coupled to positive terminal 102 via diode 132 and to negative terminal 104 via diode 138.

During operation, generator 112 produces three-phase alternating current electrical power. More specifically, a rotor (not shown) induces alternating magnetic fields into first, second, and third windings 114, 116, and 118, respectively. The magnetic fields cause alternating electrical currents to flow through windings 114, 116, and 118 at phase offsets of substantially 0, 120, and 240 degrees. Diodes 128, 130, 132, 134, 136, and 138 facilitate converting the alternating current provided by windings 114, 116, and 118 to direct current. The phase offsets of current flowing through windings 114, 116, and 118 facilitate providing a substantially uniform power to one or more loads (not shown) that may be coupled to terminals 102 and 104. Due to the wye configuration of windings 114, 116, and 118, one or more high amplitude third harmonic currents may result in the center point 120 connection to chassis ground 106. To minimize these currents, inductor 140 is provided. However, to properly reduce the harmonic currents, inductor 140 must have a sufficiently high inductance. As a result, inductor 140 may add substantial weight to the power distribution system. If multiple generators are provided in an aircraft power distribution system, multiple inductors 140 must be provided. Accordingly, the prior art system 100 may significantly and undesirably increase the weight of the aircraft power distribution system.

Figure 3:
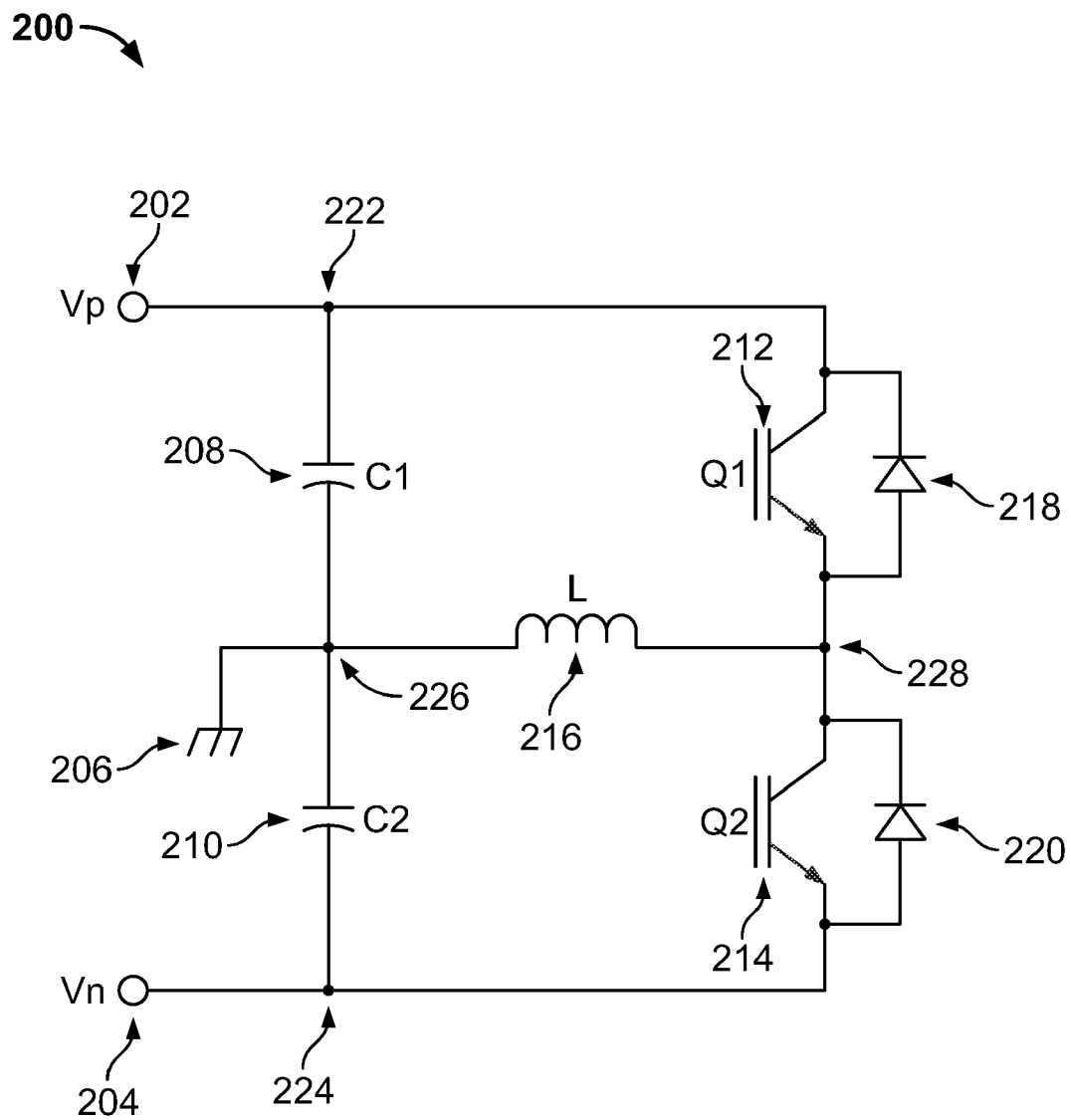
FIG. 3 is a schematic diagram of an exemplary bus centering device that may be used with the aircraft power distribution system shown in FIG. 1.

FIG. 3 is a schematic illustration of a bus centering device 200 in accordance with an exemplary embodiment of the present invention. In the exemplary embodiment, device 200 includes a positive bus terminal 202 and a negative bus terminal 204. Terminals 202 and 204 are configured to be connected to a primary electrical distribution line such as electrical bus 50 (shown in FIG. 1). More specifically, in the exemplary embodiment, positive terminal 202 is coupled to a positive DC voltage rail (not shown) and negative terminal 204 is coupled to a negative DC voltage rail (not shown) of bus 50. Positive terminal 202 is coupled to a positive node 222, negative terminal 204 is coupled to a negative node 224, and a chassis ground 206 is coupled to a ground node 226. A first capacitor 208 is coupled between positive node 222 and ground node 226. A second capacitor 210 is coupled between negative node 224 and ground node 226. A collector of a first switching device 212 is coupled to positive node 222, and a drain of first switching device 212 is coupled to a common node 228. A collector of a second switching device 214 is coupled to common node 228, and a drain of second switching device 214 is coupled to negative node 224. An inductor 216 is coupled between common node 228 and ground node 226.

In the exemplary embodiment, first switching device 212 includes a transistor Q1 and a diode 218 that is coupled in parallel to transistor Q1. More specifically, transistor Q1 is an insulated gate bipolar transistor (IGBT). In the exemplary embodiment, second switching device 214 includes a transistor Q2 and a diode 220 that is coupled in parallel to transistor Q2. More specifically, transistor Q2 is an IGBT. Diodes 218 and/or 220 are configured to maintain a continuity of current from inductor 216 when transistors Q1 and/or Q2 are switched to an "off" state. In an alternative embodiment, each of first and second switching devices 212 and 214 includes a different transistor type, or any other switching device that may operate as described herein. As described herein, device 200 facilitates centering bus 50 without requiring the use of a third harmonic suppression inductor, such as inductor 140 (shown in FIG. 2). Rather, a design of device 200 facilitates centering bus 50 with inductor 216 having a smaller inductance than inductor 140. As such, inductor 216 may be provided with a comparatively smaller core and/or winding, which facilitates reducing a weight of device 200.

During operation, a first DC voltage Vp is applied to positive terminal 202 and a second DC voltage Vn is applied to negative terminal 204 via bus 50 such that Vp is more positive than Vn. First switching device 212 is switched by a first external control device at a first duty cycle. Second switching device 214 is switched by a second external control device at a second duty cycle. In the exemplary embodiment, the first duty cycle is approximately 50%, and the second duty cycle is approximately 50%, but a turn-on of second switching device 214 is phase-delayed from a turn-on of first switching device 212 by approximately 180 degrees. As such, first switching device 212 and second switching device 214 switch at alternating times. More specifically, when first switching device 212 is switched to an "on" state, second switching device 214 is switched to an "off" state. When first switching device 212 is switched to an "off" state, second switching device 214 is switched to an "on" state. As such, a voltage at common node 228 alternates between the first DC voltage Vp and the second DC voltage Vn in a substantially square wave pattern. As such, the average voltage at common node 228 is approximately equal to (Vp+Vn)/2. Because an inductor generally enables a DC current to flow through the inductor substantially unimpeded, inductor 216 forces the voltage at common node 228 to be approximately equal to the voltage at ground 206. As such, bus centering device 200 substantially centers Vp and Vn, and bus 50, about ground 206. More specifically, first DC voltage Vp is forced to substantially (Vp +Vn)/2 and the second DC voltage Vn is forced to substantially −(Vp+Vn)/2 with respect to ground 206.

Figure 4:
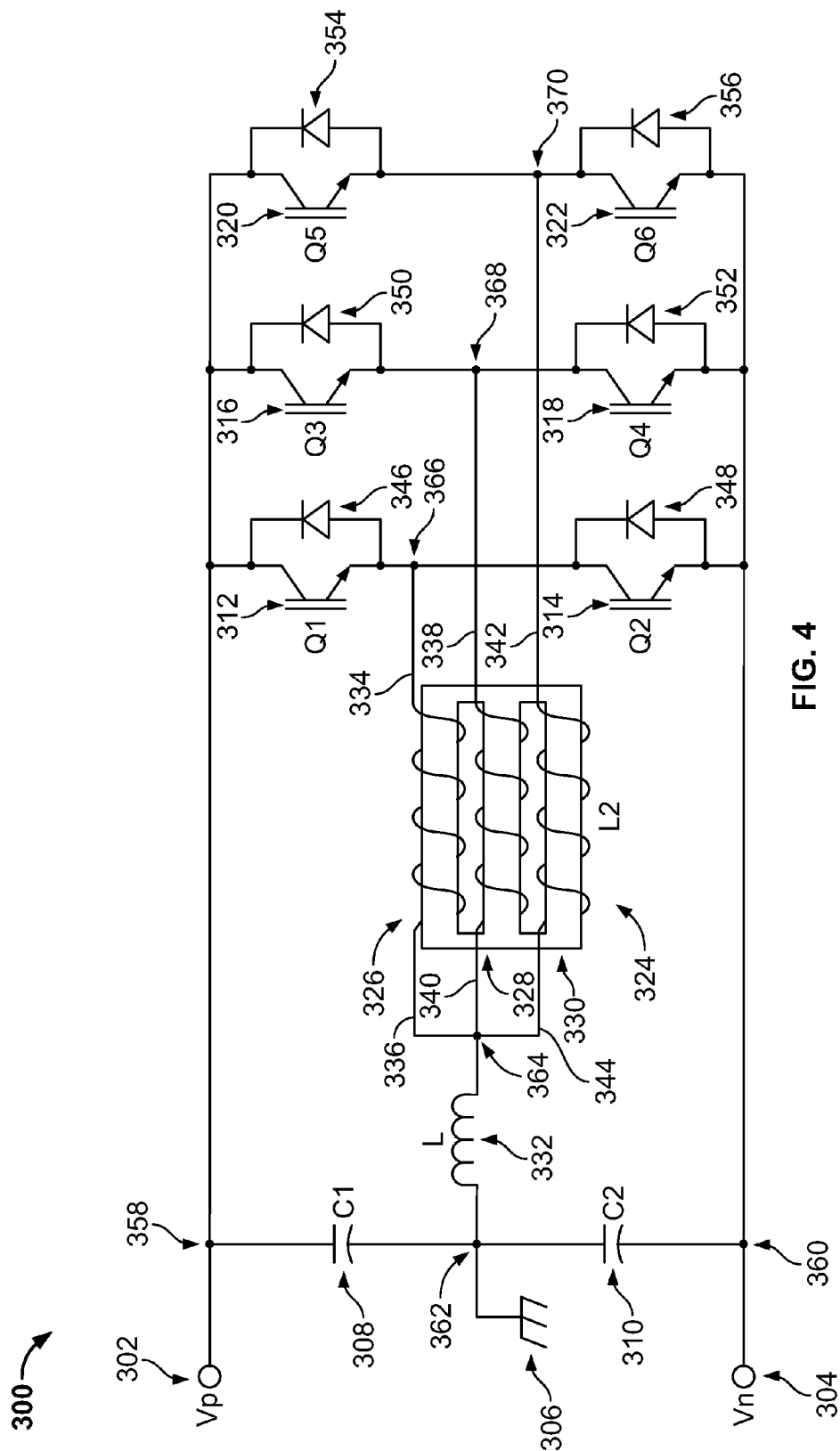
FIG. 4 is a schematic diagram of an alternative bus centering device that may be used with the aircraft power distribution system shown in FIG. 1.

FIG. 4 is a schematic illustration of a bus centering device 300 in accordance with an alternative embodiment of the present invention. In the alternative embodiment, device 300 includes a positive bus terminal 302 and a negative bus terminal 304. Terminals 302 and 304 are configured to be connected to a primary electrical distribution line such as electrical bus 50 (shown in FIG. 1). More specifically, in the alternative embodiment, terminal 302 is coupled to a positive DC voltage rail (not shown) and terminal 304 is coupled to a negative DC voltage rail (not shown) of bus 50. Positive terminal 302 is coupled to a positive node 358, negative terminal 304 is coupled to a negative node 360, and an aircraft chassis ground 306 is coupled to a ground node 362. Positive terminal 302 is coupled to ground 306 via a first capacitor 308. Negative terminal 304 is coupled to ground 306 via a second capacitor 310. A collector of each of a first switching device 312, a third switching device 316, and a fifth switching device 320 are coupled to positive node 358. A drain of each of a second switching device 314, a fourth switching device 318, and a sixth switching device 322 are coupled to negative node 360. A drain of first switching device 312 and a collector of second switching device 314 are coupled to a first common node 366. A drain of third switching device 316 and a collector of fourth switching device 318 are coupled to a second common node 368. A drain of fifth switching device 320 and a collector of sixth switching device 322 are coupled to a third common node 370. Device 300 further includes an inductor 332 and a three leg interphase transformer 324 that includes a first winding 326, a second winding 328, and a third winding 330. A first terminal 334 of first winding 326 is coupled to first common node 366. A first terminal 338 of second winding 328 is coupled to second common node 368. A first terminal 342 of third winding 330 is coupled to third common node 370. Each of first, second, and third windings 326, 328, and 330 include a respective second terminal 336, 340, and 344 that are coupled together at a common inductor node 364. Inductor 332 is coupled between ground node 362 and inductor node 364. In one embodiment, inductor node 364 is coupled to ground 306 via inductor 332. In the alternative embodiment, inductor 332 is omitted, and each of first, second, and third winding second terminals 336, 340, and 344 are coupled directly to ground 306.

In the alternative embodiment, each of first, second, third, fourth, fifth, and sixth switching devices 312, 314, 316, 318, 320, and 322 includes a respective transistor Q1, Q2, Q3, Q4, Q5, and Q6, and an associated diode 346, 348, 350, 352, 354, and 356 that is coupled in parallel to respective transistors Q1, Q2, Q3, Q4, Q5, and Q6. More specifically, in the alternative embodiment, transistors Q1, Q2, Q3, Q4, Q5, and Q6 are insulated gate bipolar transistors (IGBT). Diodes 346, 348, 350, 352, 354 and/or 356 are configured to maintain a continuity of current from inductor 216 when transistors Q1, Q2, Q3, Q4, Q5 and/or Q6 are switched to an "off" state. In another embodiment, each of first, second, third, fourth, fifth, and sixth switching devices 312, 314, 316, 318, 320, and 322 includes a different transistor type, or any other switching device that may operate as described herein. As described herein, device 300 facilitates centering bus 50 without requiring the use of a third harmonic suppression inductor, such as inductor 140 (shown in FIG. 2). Rather, a design of device 300 facilitates centering bus 50 with inductor 332 and/or three leg interphase transformer 324 having a smaller inductance than inductor 140. As such, inductor 332 and/or three leg interphase transformer 324 may be provided with at least one comparatively smaller core and/or winding, which facilitates reducing a weight of device 300.

During operation, a first DC voltage Vp is applied to positive terminal 302 and a second DC voltage Vn is applied to negative terminal 304 via bus 50 such that Vp is more positive than Vn. First switching device 312 is switched by an external control device at a first duty cycle. Second switching device 314 is switched by an external control device at a second duty cycle. In the alternative embodiment, the first duty cycle is approximately 50%, and the second duty cycle is approximately 50%, but a turn-on of second switching device 314 is phase-delayed from a turn-on of first switching device 312 by approximately 180 degrees. Third switching device 316 is switched by an external control device at a third duty cycle. Fourth switching device 318 is switched by an external control device at a fourth duty cycle. In the alternative embodiment, the third duty cycle is approximately 50%, and the fourth duty cycle is approximately 50%, but a turn-on of fourth switching device 318 is phase-delayed from a turn-on of third switching device 316 by approximately 180 degrees. Moreover, the turn-on of third switching device 316 is phase-delayed from the turn-on of first switching device 312 by approximately 120 degrees, and the turn-on of fourth switching device 318 is phase-delayed from the turn-on of second switching device 314 by approximately 120 degrees. Fifth switching device 320 is switched by an external control device at a fifth duty cycle. Sixth switching device 322 is switched by an external control device at a sixth duty cycle. In the alternative embodiment, the fifth duty cycle is approximately 50%, and the sixth duty cycle is approximately 50%, but a turn-on of sixth switching device 322 is phase-delayed from a turn-on of fifth switching device 320 by approximately 180 degrees. Moreover, the turn-on of fifth switching device 320 is phase-delayed from the turn-on of first switching device 312 by approximately 240 degrees, and the turn-on of sixth switching device 322 is phase-delayed from the turn-on of second switching device 314 by approximately 240 degrees. In another embodiment, first, second, third, fourth, fifth, and/or sixth duty cycles are different than approximately 50%, and/or the switching of first, second, third, fourth, fifth, and sixth switching devices 312, 314, 316, 318, 320, and 322 are phase-delayed by different amounts as required. In the alternative embodiment, first, second, third, fourth, fifth, and sixth switching devices 312, 314, 316, 318, 320, and 322 are switched by one external control device. In another embodiment, first, second, third, fourth, fifth, and sixth switching devices 312, 314, 316, 318, 320, and 322 are switched by a plurality of external control devices.

As such, first switching device 312 and second switching device 314 switch alternating times, in the same manner as described above in FIG. 3. In the same manner, third switching device 316 and fourth switching device 318 switch at alternating times, and fifth switching device 320 and sixth switching device 322 switch at alternating times. Accordingly, bus centering device 300 operates in a similar fashion as bus centering device 200 (shown in FIG. 3), except that device 300 operates with three pairs of alternating switching devices, each pair being interleaved by 120 degrees from the previous pair. As such, a voltage at first common node 366 alternates between the first DC voltage Vp and the second DC voltage Vn in a substantially square wave pattern, and has an average voltage of that is approximately equal to (Vp+Vn)/2. Because an inductor generally enables a DC current to flow through the inductor substantially unimpeded, first winding 326 forces the voltage at first common node 366 to be approximately equal to the voltage at ground 306. In the same manner, second winding 328 forces the voltage at second common node 368 to be approximately equal to the voltage at ground 306, and third winding 330 forces the voltage at third common node 370 to be approximately equal to the voltage at ground 306. As such, bus centering device 300 substantially centers Vp and Vn, and bus 50, about ground 306. More specifically, first DC voltage Vp is forced to substantially (Vp+Vn)/2 and the second DC voltage Vn is forced to substantially −(Vp+Vn)/2 with respect to ground 306.

As a result of the interleaving of the first, second, third, fourth, fifth, and sixth duty cycles of switching devices 312, 314, 316, 318, 320, and 322, a ripple current is created at the common endpoint of first, second, and third winding second terminals 336, 340, and 344. This ripple current has a frequency that is substantially three times the switching frequency of bus centering device 300. More specifically, the ripple current has a frequency that is substantially three times the switching frequency of first, second, third, fourth, fifth, and sixth switching devices 312, 314, 316, 318, 320, and 322. Moreover, as a result of the above described interleaving of the duty cycles, the ripple current has an amplitude that is substantially one third of the ripple current amplitude found in bus centering device 200. As such, one of ordinary skill in the art will appreciate that bus centering device 300 facilitates use with higher power distribution systems. One of ordinary skill in the art will also appreciate that bus centering device 300 may be extended to include additional switching devices and/or transformer windings to accommodate higher electrical distribution system power levels.

The above-described embodiments facilitate providing an efficient and cost-effective method and apparatus for electrical bus centering. The described embodiments facilitate providing a lighter and more efficient device for centering an electrical power distribution system about ground. The bus centering device facilitates reducing third harmonic currents without using a third harmonic suppression inductor. The above described embodiments also facilitate enabling multiple power sources to be coupled in parallel. Moreover, the device facilitates reducing the magnitude of ripple currents within a power distribution system.

Exemplary embodiments of a method and apparatus for electrical bus centering are described above in detail. The method and apparatus are not limited to the specific embodiments described herein, but rather, components of the apparatus and/or steps of the method may be utilized independently and separately from other components and/or steps described herein. For example, the bus centering device may also be used in combination with other measuring systems and methods, and is not limited to practice with only aircraft power distribution systems as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bus centering device for use in an aircraft electrical power distribution system that includes a positive bus rail, a negative bus rail, and a ground, said device comprising:
   a central node;
   a first switching component configured to couple the central node to the positive bus rail for a first predetermined duty cycle;
   a second switching component configured to couple the central node to the negative bus rail for a second predetermined duty cycle;
   an inductive component comprising a three leg interphase transformer coupled between the central node and ground, said inductive component configured to maintain a voltage at the central node substantially equal to ground potential, wherein a voltage between the positive bus rail and the central node is maintained substantially equal to a voltage between the negative bus rail and the central node;
   a first current limiting device coupled to said first switching component and said inductive component, said first current limiting device configured to maintain a continuity of current from said inductive component when said first switching component is turned off; and
   a second current limiting device coupled to said second switching component and said inductive component, said second current limiting device configured to maintain a continuity of current from said inductive component when said second switching component is turned off.

2. A device in accordance with claim 1, wherein said first switching component is switched at a first duty cycle of approximately 50% and said second switching component is switched at a second duty cycle of approximately 50%, the switching of said second switching component is phase-delayed by approximately 180 degrees from the switching of said first switching component.

3. A device in accordance with claim 1, wherein said device comprises a third, fourth, fifth, and sixth switching component.

4. A device in accordance with claim 3, wherein said third switching component is switched at a third duty cycle of approximately 50% and said fourth switching component is switched at a fourth duty cycle of approximately 50%, the switching of said fourth switching component is phase-delayed by approximately 180 degrees from the switching of said third switching component.

5. A device in accordance with claim 3, wherein said fifth switching component is switched at a fifth duty cycle of approximately 50% and said sixth switching component is switched at a sixth duty cycle of approximately 50%, the switching of said sixth switching component is phase-delayed by approximately 180 degrees from the switching of said fifth switching component.

6. An aircraft electrical power distribution system that includes a positive bus rail, a negative bus rail, and a ground, said system comprising:
   a power source;
   a load; and
   a bus centering device comprising:
      a central node;
      a first switching component configured to couple the central node to the positive bus rail for a first predetermined duty cycle;
      a second switching component configured to couple the central node to the negative bus rail for a second predetermined duty cycle;
      a three leg interphase transformer coupled between the central node and ground, said inductive component configured to maintain a voltage at the central node substantially equal to ground potential, wherein a voltage between the positive bus rail and the central node is maintained substantially equal to a voltage between the negative bus rail and the central node;

a first current limiting device coupled to said first switching component and said inductive component, said first current limiting device configured to maintain a continuity of current from said inductive component when said first switching component is turned off; and a second current limiting device coupled to said second switching component and said inductive component, said second current limiting device configured to maintain a continuity of current from said inductive component when said second switching component is turned off.

7. A system in accordance with claim 6, wherein said first switching component is switched at a first duty cycle of approximately 50% and said second switching component is switched at a second duty cycle of approximately 50%, the switching of said second switching component is phase-delayed by approximately 180 degrees from the switching of said first switching component.

8. A system in accordance with claim 6, wherein said device comprises a third, fourth, fifth, and sixth switching component.

9. A system in accordance with claim 8, wherein said third switching component is switched at a third duty cycle of approximately 50% and said fourth switching component is switched at a fourth duty cycle of approximately 50%, the switching of said fourth switching component is phase-delayed by approximately 180 degrees from the switching of said third switching component.

10. A system in accordance with claim 8, wherein said fifth switching component is switched at a fifth duty cycle of approximately 50% and said sixth switching component is switched at a sixth duty cycle of approximately 50%, the switching of said sixth switching component is phase-delayed by approximately 180 degrees from the switching of said fifth switching component.

11. A system in accordance with claim 6, wherein said inductive component further comprises an inductor that is coupled to said three leg interphase transformer.

12. A method for centering an aircraft electrical power distribution system that includes a positive bus rail, a negative bus rail, and a ground, said method comprising:

providing a power source and a load that is coupled to the power source;

coupling a bus centering device to the positive bus rail, the negative bus rail, and the ground, the bus centering device includes:

a central node;

a first switching component, a second switching component, and an inductive component, the inductive component is coupled between the central node and ground;

coupling a three leg interphase transformer to the first switching component and to the second switching component;

coupling the central node to the positive bus rail for a first predetermined duty cycle;

coupling the central node to the negative bus rail for a second predetermined duty cycle; and maintaining a voltage at the central node substantially equal to ground potential, wherein a voltage between the positive bus rail and the central node is maintained substantially equal to a voltage between the negative bus rail and the central node.

13. A method in accordance with claim 12, wherein the method further includes switching the first switching component at a first duty cycle of approximately 50% and switching the second switching component at a second duty cycle of approximately 50%, wherein the switching of the second switching component is phase-delayed by approximately 180 degrees from the switching of the first switching component.

14. A method in accordance with claim 12, wherein the method further includes coupling a third, fourth, fifth, and sixth switching component to at least one of the first input terminal and the second input terminal.

15. A method in accordance with claim 14, wherein the method further includes switching the third switching component at a third duty cycle of approximately 50% and switching the fourth switching component at a fourth duty cycle of approximately 50%, wherein the switching of the fourth switching component is phase-delayed by approximately 180 degrees from the switching of the third switching component.

16. A method in accordance with claim 14, wherein the method further includes switching the fifth switching component at a fifth duty cycle of approximately 50% and switching the sixth switching component at a sixth duty cycle of approximately 50%, wherein the switching of the sixth switching component is phase-delayed by approximately 180 degrees from the switching of the fifth switching component.

17. A method in accordance with claim 12, wherein the method further includes coupling an inductor to the three leg interphase transformer.

* * * * *